United States Patent
Nitta

(10) Patent No.: US 6,971,275 B2
(45) Date of Patent: Dec. 6, 2005

(54) SHIFT CONTROL APPARATUS OF AUTOMATIC VEHICLE TRANSMISSION

(75) Inventor: Tomoaki Nitta, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 56 days.

(21) Appl. No.: 10/809,646

(22) Filed: Mar. 25, 2004

(65) Prior Publication Data

US 2004/0192493 A1    Sep. 30, 2004

(30) Foreign Application Priority Data

Mar. 27, 2003 (JP) ............................. 2003-087002

(51) Int. Cl.⁷ .............................................. F16H 61/16
(52) U.S. Cl. ...................... 74/335; 74/336 R; 477/903
(58) Field of Search ......................... 477/903; 74/335, 74/336 R

(56) References Cited

U.S. PATENT DOCUMENTS 4,788,892 A * 12/1988 Komoda et al. ............ 477/903
6,416,440 B1 * 7/2002 Jeon ........................... 477/123

FOREIGN PATENT DOCUMENTS

| JP | 63-149451 | * | 6/1988 | ................ 477/903 |
| JP | 63-149452 | * | 6/1988 | ................ 477/903 |
| JP | 5-10424 | * | 1/1993 | ................ 477/903 |
| JP | 2001-227599 | | 8/2001 | |

* cited by examiner

Primary Examiner—Sherry Estremsky
(74) Attorney, Agent, or Firm—Smith, Gambrell & Russell

(57) ABSTRACT

An input shaft with plural drive gears and an output shaft with plural driven gears engaging the drive gears forms transmission gear trains. An input clutch transmitting power to the input shaft is between an engine and the input shaft, and a bypass clutch transmitting the power to the output shaft is between the input and output shafts. A changing mechanism changes any of the transmission gear trains in a power transmission state, a steering angle detecting means detects a steering angle of a wheel, and an input clutch control means engagement controls the input clutch. The input clutch control means inhibits a shifting operation in a state of disengaging the input clutch, by inhibiting output of a disengagement signal to the input clutch, in the case that the steering angle is more than an allowable value, and a shifting in a state of engaging no bypass clutch is judged.

4 Claims, 8 Drawing Sheets

SHIFT CONTROL APPARATUS OF AUTOMATIC VEHICLE TRANSMISSION

TECHNICAL FIELD OF THE INVENTION

The present invention relates to a shift control apparatus of an automatic transmission mounted on a vehicle, and more particularly to an operative technology applied to a shift control apparatus of an automatic transmission which transmits and interrupts a power with respect to an input shaft via an input clutch.

BACKGROUND OF THE INVENTION

A manual type transmission (MT) executing a shift operation on the basis of a manual operation by a driver has an input shaft which is connected to an engine and to which a plurality of drive gears are attached, and an output shaft to which a plurality of driven gears forming pairs together with the driver gears are attached and which is connected to a drive wheel. A plurality of transmission gear trains are provided between the input shaft and the output shaft. In this MT, a shift motion, that is, a shift change is executed by changing any one of the transmission gear trains by a changing mechanism such as a manually operated synchromesh mechanism or the like after disengaging the input clutch, and again engaging the input clutch.

In the case that the shift change is executed by using a hydraulically driven shift actuator, the automatic transmission on the basis of the MT can be achieved. This type of automatic transmission (an automated manual transmission, abbreviated as an AMT) having a plurality of transmission gear trains can reduce a number of parts so as to easily achieve a weight saving in comparison with a normal torque converter type automatic transmission (AT) having a planetary gear or the like in an automatic transmission mechanism, and has an advantage that a transmission efficiency of a drive system is high.

As the AMT type automatic transmission as shown in Japanese Patent Application Laid-open No. 2001-227599, there has been developed a structure provided with a bypass clutch for transmitting the power from the input shaft to the output shaft at a time of changing gears. In accordance with the automatic transmission, it is possible to avoid a torque break during the shift change by transmitting the power from the input shaft to the output shaft with using the bypass clutch. In other words, it is possible to reduce a decline of a driving torque during the shift change, and it is possible to achieve an improvement of a shift quality.

Two shifting methods are employed in the AMT type automatic transmission. At first, as one shifting method, there is a method of automatically the same shifting method as that of the MT, namely the shifting method preformed by disengaging the input clutch. In the case of executing the shift change from a first speed to a second speed by using the shifting method, the transmission gear trains are changed from the first speed to the second speed in a state in which the input clutch is disengaged, and the input clutch is engaged again after synchronizing an engine speed with an input shaft rotational speed in accordance with a half clutch control of the input clutch or an on-off control of an electronic controlled throttle.

Further, as another shifting method, there is the above-mentioned method using the bypass clutch, namely the method performed in the state where the input clutch is engaged. In the case that the shift change is executed from the first speed to the second speed by using this shifting method, after the driving torque applied to the first speed is reduced due to the engagement of the bypass clutch, the first speed of the transmission gear trains is changed into a neutral state. Then, by further increasing an engaging force of the bypass clutch, the input shaft rotational speed is synchronized with a rotational speed corresponding to the second speed. After the transmission gear trains are changed from the neutral state to the second speed, the bypass clutch is disengaged. In this case, even in the automatic transmission employing the shifting method using the bypass clutch, the shifting method using the input clutch is executed in correspondence to a selection of the driver and a running condition of the vehicle.

However, in the shifting method using the input clutch among the above two methods, since the input clutch is temporarily disengaged, the torque break is generated with respect to the drive wheel. In general, a starting condition of the automatic transmission is determined on the basis of a map in which a vehicle speed and a throttle opening degree are set as a parameter, however, in the case that the automatic transmission using the input clutch is started in the course of turning around a point of intersection or the like, there is a risk that a fluctuation of a turning property such as an under-steering, an over-steering or the like is generated due to the disengagement of the input clutch, and there is a risk that an unstableness of the vehicle motion is generated.

SUMMARY OF THE INVENTION

An object of the present invention is to provide a shift control apparatus of an automatic transmission structured such as to improve a driving stability in the course of turning of a vehicle.

In accordance with a first aspect of the present invention, there is provided a shift control apparatus of an automatic vehicle transmission comprising: an input shaft provided with a plurality of drive gears; an output shaft arranged in parallel to the input shaft and provided with a plurality of driven gears engaging with the drive gears so as to form transmission gear trains; an input clutch arranged between an engine and the input shaft and changed into an engaged state for transmitting a power to the input shaft and a disengaged state for interrupting the power; a changing mechanism changing any one of the transmission gear trains into a power transmission state; a steering angle detecting means for detecting a steering angle of a wheel; and an input clutch control means for outputting a disengagement signal to the input clutch in the case that the steering angle is less than an allowable value and inhibiting an output of the disengagement signal in the case that the steering angle is more than the allowable value, at a time of executing a gear-shift operation, wherein, in the case that the steering angle is more than the allowable value, the gear-shift operation in a state that the input clutch is disengaged is inhibited.

In accordance with a second aspect of the present invention, there is provided a shift control apparatus of an automatic vehicle transmission as recited in the first aspect, further comprising: a bypass clutch arranged between the input shaft and the output shaft and changed into an engaged state for transmitting a power from the input shaft to the output shaft and a disengaged state for interrupting the power at a time of executing the gear-shift operation, wherein the input clutch control means inhibits the gear-shift operation in a state that the input clutch is disengaged, by inhibiting the output of the disengagement signal applied to the input clutch, in the case that there is judged the shifting operation in which the steering angle is more than the allowable value and the bypass clutch is not engaged.

In accordance with a third aspect of the present invention, there is provided a shift control apparatus of an automatic vehicle transmission as recited in any one of the aspects mentioned above, further comprising: a vehicle speed detecting means for detecting a vehicle speed, wherein the allowable value is set in correspondence to the vehicle speed.

In accordance with a fourth aspect of the present invention, there is provided a shift control apparatus of an automatic vehicle transmission as recited in any one of the aspects mentioned above, further comprising: a rotational speed estimating means for estimating an engine speed at a time of maintaining a transmission speed range, wherein the input clutch control means inhibits the gear-shift operation in a state that the input clutch is disengaged, by inhibiting the output of the disengagement signal applied to the input clutch, in the case that the steering angle is more than the allowable value and the engine speed is within an allowable range.

In accordance with the shift control apparatus of the automatic transmission on the basis of the present invention, since the structure is made such that the shifting operation is inhibited in a state in which the input clutch is disconnected, in the case that the vehicle is in a predetermined turning state, by judging a magnitude of the steering angle, it is possible to avoid a decline of the driving torque in the course of turning, and it is possible to improve a driving stability of the vehicle.

Further, since the structure is made such that the allowable value is changed in correspondence to the vehicle speed, it is possible to set the steering angle inhibiting the clutch disengagement shift in correspondence to the vehicle speed range. Accordingly, in the vehicle speed range in which the shifting operation is inhibited in a state in which the input clutch is disconnected, it is possible to securely execute a normal shifting operation in accordance with a shifting property map.

Further, since the structure is made such that the engine rotational speed in the case of maintaining the transmission speed range is estimated, and it is comparatively judged whether or not the engine is within the allowable range, it is possible to avoid a trouble in view of traveling due to the inhibition of the gear-shift operation.

DESCRIPTION OF THE PREFERRED EMBODIMENTS

A description will be in detail given below of an embodiment in accordance with the present invention with reference to the accompanying drawings.

Figure 1:
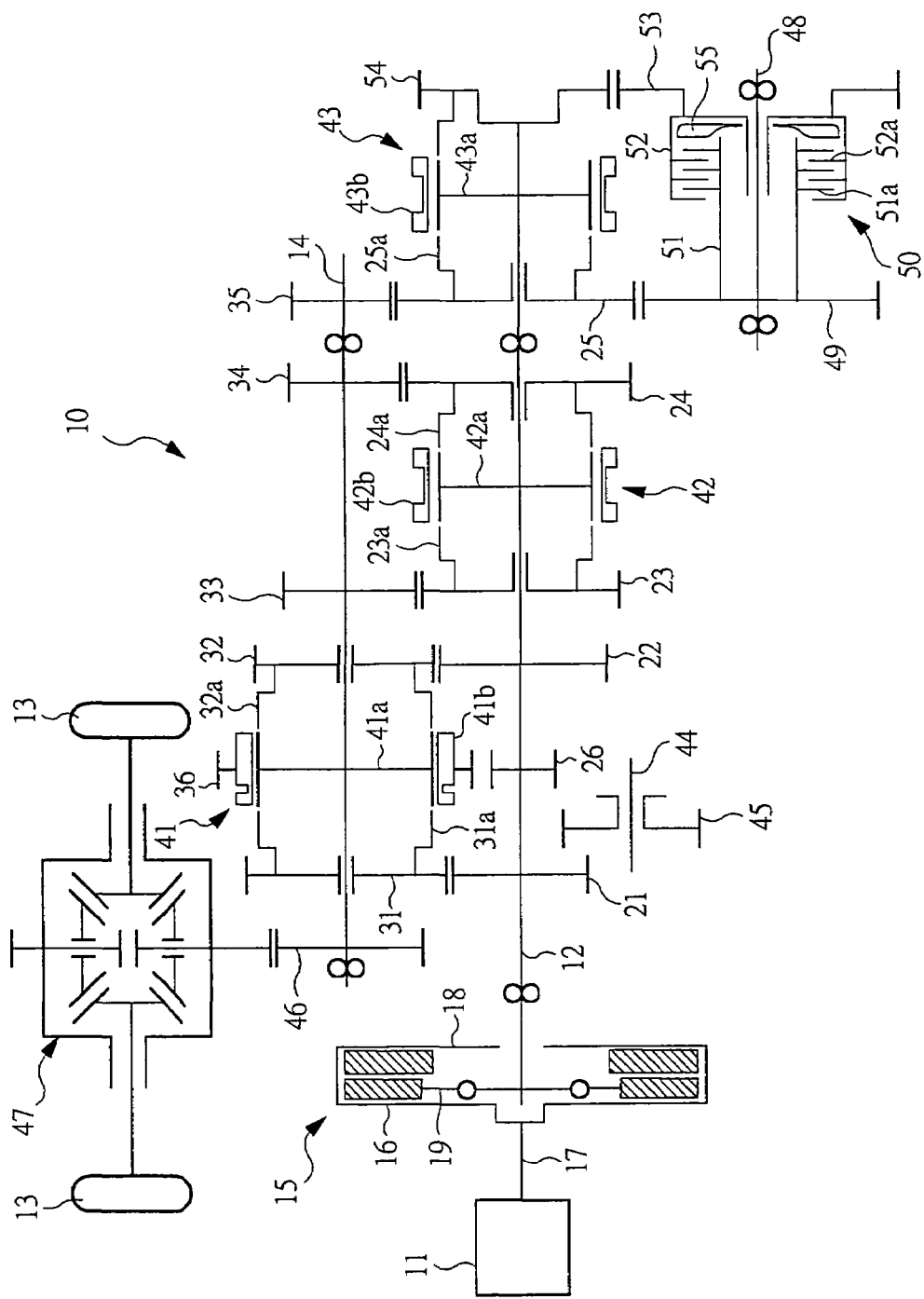
FIG. 1 is a skeleton view showing an automatic transmission which is controlled by a shift control apparatus in accordance with an embodiment of the present invention.

FIG. 1 is a skeleton view showing an automatic transmission 10 which is controlled by a shift control apparatus in accordance with an embodiment of the present invention. The automatic transmission 10 has an input shaft 12 connected to an engine 11, and an output shaft 14 arranged in parallel to the input shaft 12 and connected to a drive wheel 13. The input shaft 12 and the output shaft 14 are incorporated in a transmission case (not shown), and the automatic transmission 10 is arranged horizontally and is applied to a front wheel drive vehicle.

An input clutch 15 is provided between the engine 11 and the input shaft 12, and the input clutch 15 is changed into an engaged state for transmitting an engine power to the input shaft 12 and a disengaged state for interrupting the engine power in accordance with a hydraulic control. The input clutch 15 is provided with a pressure plate 18 which is mounted to a crank shaft 17 of the engine 11 via a flywheel 16, and with a clutch disc 19 which is mounted to the input shaft 12. The pressure plate 18 is pressed against the clutch disc 19 by a clutch spring, and the pressing against the clutch disc 19 is cancelled by a hydraulically driven release fork. In other words, the engine power is transmitted to the input shaft 12 by engaging the pressure plate 18 and the clutch disc 19 on the basis of a spring force, and the transmission of the engine power is interrupted by actuating the release fork so as to cancel the engagement. In this case, the illustrated input clutch 15 is of a single disc type, however, a multiple disc type input clutch may be employed.

A first speed drive gear 21 and a second speed drive gear 22 are fixed to the input shaft 12, and third speed to fifth speed drive gears 23 to 25 are rotatably attached to the input shaft 12. On the other hand, a first speed driven gear 31 and a second speed driven gear 32 are rotatably attached to the output shaft 14, and third speed to fifth speed driven gears 33 to 35 are fixed to the output shaft 14. The drive gears 21 to 25 are respectively engaged with the corresponding driven gears 31 to 35 so as to form transmission gear trains in forward moving stages. When any one of a plurality of transmission gear trains is changed to a power transmission state, the automatic transmission 10 is changed to a transmission speed range in correspondence to the transmission gear train, and the output shaft 14 is driven to rotate on the basis of a driving torque in correspondence to the transmission speed range.

The output shaft 14 is provided with a first changing mechanism 41 for changing the transmission speed range to any one of a first speed and a second speed. Further, the input shaft 12 is provided with a second changing mechanism 42 for changing the transmission speed range to any one of a third speed and a fourth speed, and a third changing mechanism 43 for changing the transmission speed range to a fifth speed. In this case, the structure may be made such that the input shaft 12 is provided with the first changing mechanism 41, and the output shaft 14 is provided with the second and third changing mechanisms 42 and 43, or that the input shaft 12 or the output shaft 14 is provided with all the changing mechanisms 41 to 43. The switching mechanisms 41 to 43 are constituted by a synchromesh mechanism.

The first changing mechanism 41 has a synchro hub 41a which is arranged between the first speed and second speed driven gears 31 and 32 and is fixed to the output shaft 14, and a synchro sleeve 41b which is always engaged with the synchro hub 41a. When engaging the synchro sleeve 41b with a spline 31a integrally formed with the driven gear 31, the first speed transmission gear train is changed to a power transmission state, and when engaging the synchro sleeve 41b with a spline 32a integrally formed with the driven gear 32, the second speed transmission gear train is changed to a power transmission state.

The second changing mechanism 42 has a synchro hub 42a which is arranged between the third speed and fourth speed drive gears 23 and 24 and is fixed to the input shaft 12, and a synchro sleeve 42b which is always engaged with the synchro hub 42a. When engaging the synchro sleeve 42b with a spline 23a integrally formed with the drive gear 23, the third speed transmission gear train is changed to a power transmission state, and when engaging the synchro sleeve 42b with a spline 24a integrally formed with the drive gear 24, the fourth speed transmission gear train is changed to a power transmission state.

The third changing mechanism 43 has a synchro hub 43a which is arranged in adjacent to the fifth speed drive gear 25 and is fixed to the input shaft 12, and a synchro sleeve 43b which is always engaged with the synchro hub 43a. When engaging the synchro sleeve 43b with a spline 25a integrally formed with the drive gear 25, the fifth speed transmission gear train is changed to a power transmission state. In this case, these changing mechanisms 41 to 43 can be actuated to a neutral state in which the synchro sleeves 41b to 43b and the splines 31a, 32a and 23a to 25a are not engaged with each other.

A drive gear 26 for a backward movement is fixed to the input shaft 12, a driven gear 36 for a backward movement is mounted to the output shaft 14 via the synchro sleeve 41b, and the gears 26 and 36 are engaged with each other via an idler gear 45 which is rotatably provided in an idler shaft 44. The idler gear 45 is attached to the idler shaft 44 so as to freely move to a position in which the idler gear 45 engages with the gear and a position in which the engagement is cancelled. When moving the idler gear 45 in an axial direction by a changing mechanism (not shown) and engaging the drive gear 26 with the driven gear 36 via the idler gear 45, the transmission gear train of the backward moving stage is changed to a power transmission state.

As mentioned above, the power transmitted to the output shaft 14 via each of the transmission gear trains is transmitted to a differential gear 47 via a reduction gear 46 fixed to an end portion of the output shaft 14. Further, the power is distributed to the right and left drive wheels 13 via the differential gear 47, and the drive wheels 13 are driven to rotate on the basis of a driving torque in correspondence to each of the transmission gear trains.

Further, an intermediate shaft 48 is provided in parallel to the input shaft 12, and an output gear 49 engaging with the fifth speed drive gear 25 is fixed to the intermediate shaft 48. A bypass clutch 50 is provided in the intermediate shaft 48, and the bypass clutch 50 is changed into an engaged state for transmitting the power from the input shaft 12 to the output shaft 14 and into a disengaged state for interrupting the engagement in accordance with a hydraulic control. The bypass clutch 50 is provided with a clutch hub 51 fixed to the output gear 49, and a clutch drum 52 rotatably arranged in the intermediate shaft 48. An input gear 53 is fixed to the clutch drum 52, and the input gear 53 is provided so as to be engaged with an input gear 54 fixed to an end portion of the input shaft 12.

A plurality of clutch plates 51a and 52a are incorporated between the clutch hub 51 and the clutch drum 52, and a hydraulic piston 55 is received in the clutch drum 52. The bypass clutch 50 is changed into the engaged state by pressing the clutch plates 51a and 52a each other via the hydraulic piston 55, and is changed into the disengaged state by releasing the pressing. A total gear ratio of the gear trains for connecting the input shaft 12 to the output shaft 14 via the bypass clutch 50 is set to a gear ratio between the third speed and the fourth speed, and it is possible to transmit the driving torque corresponding to an intermediate gear ratio between the third speed and the fourth speed to the output shaft 14 by changing the bypass clutch 50 to the engaged state.

Figure 2:
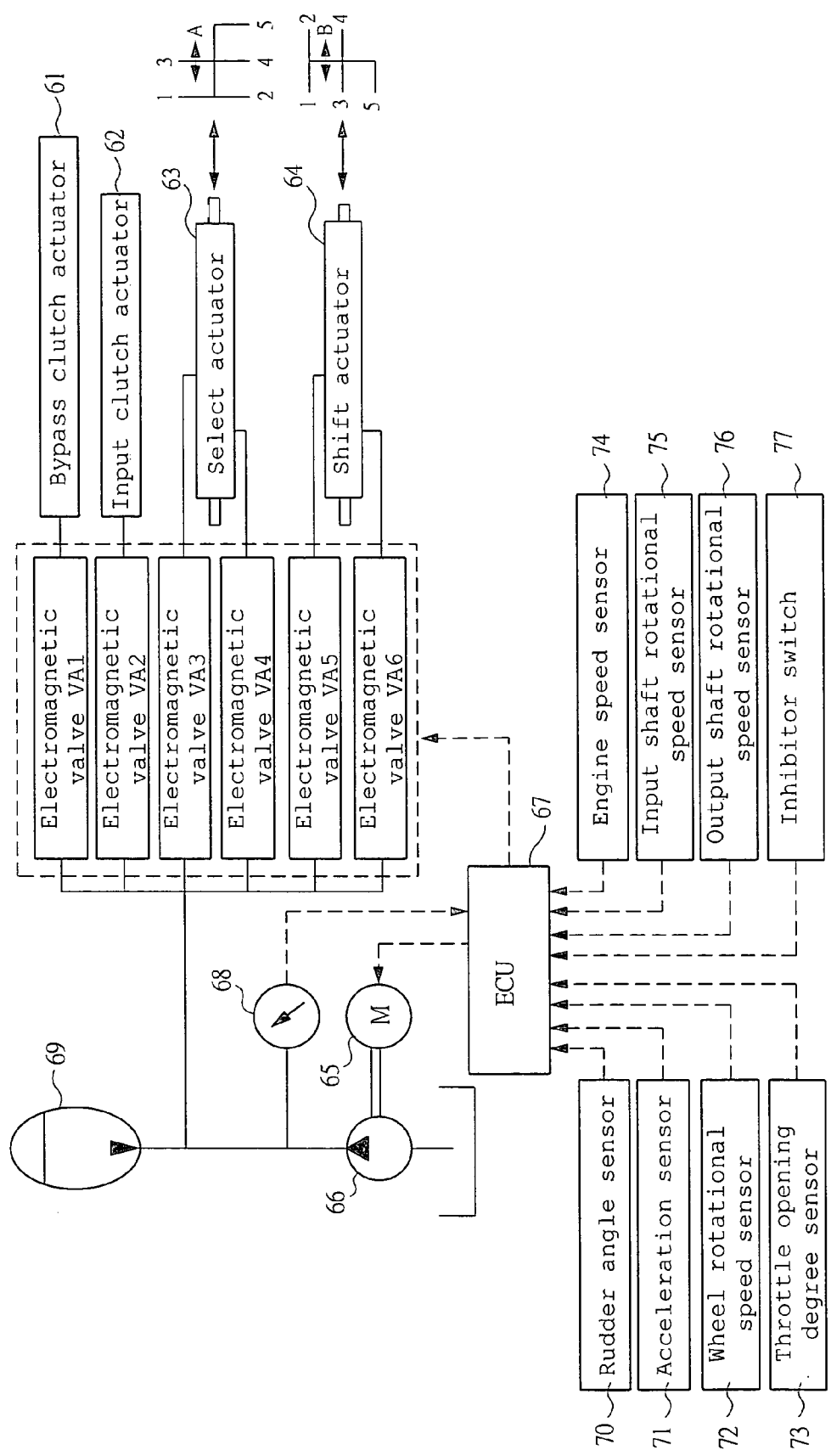
FIG. 2 is a block diagram showing a hydraulic control system.

FIG. 2 is a block diagram showing a hydraulic control system for executing an automatic transmission. In this case, FIG. 2 is illustrated omitting a hydraulic control system used for setting the backward moving stage. As shown in FIG. 2, the hydraulic control system has a bypass clutch actuator 61 for actuating the bypass clutch 50, and an input clutch actuator 62 for actuating the input clutch 15. Further, in order to change any one of a plurality of transmission gear trains to the power transmitting state, the hydraulic control system has a select actuator 63 and a shift actuator 64. A linear reciprocation of two actuators 63 and 64 is transmitted to each of the changing mechanisms 41 to 43 via a direction changing mechanism (not shown). In this case, the select actuator 63 selects any one of the changing mechanisms 41 to 43 actuated as shown by an arrow A in FIG. 2, and the shift actuator 64 actuates the selected changing mechanism 41 to 43 as shown by an arrow B so as to change the transmission gear train to the power transmitting state.

A working fluid for driving each of the actuators 61 to 64 is supplied by an oil pump 66 driven by an electric motor 65. The working fluid is supplied to the bypass clutch actuator 61 via an electromagnetic valve VA1, and the working fluid is supplied to the input clutch actuator 62 via an electromagnetic valve VA2. Further, the working fluid is supplied to the select actuator 63 via electromagnetic valves VA3 and VA4, and the working fluid is supplied to the shift actuator 64 via electromagnetic valves VA5 and VA6.

Each of the electromagnetic valves VA1 to VA6 and the electric motor 65 is driven on the basis of a drive signal output from an ECU 67 corresponding to an electronic control unit. A discharge pressure from the oil pump 66 driven by the electric motor 65 is monitored by a pressure sensor 68, and a part of the discharged working fluid is accumulated in an accumulator 69, whereby a stabilization of a line pressure is achieved. Further, even in the case that a trouble such as a malfunction of the oil pump 66, an oil leakage or the like is generated in the hydraulic system, a minimum emergency operation can be secured by the pressure accumulated in the accumulator 69. In this case, the oil pump 66 may be driven by an engine power.

Various signals are input to the ECU 67 from various sensors and switches. As the various sensors and switches, there are provided a steering angle sensor 70, an acceleration sensor 71, a wheel rotational speed sensor 72, a throttle opening degree sensor 73, an engine rotational speed sensor 74, an input shaft rotational speed sensor 75, an output shaft rotational speed sensor 76, an inhibitor switch 77 and the like. The ECU 67 detects a vehicle condition on the basis of the various signals input thereto, and outputs a control signal to each of the electromagnetic valves VA1 to VA6 as occasion demands.

In other words, the ECU 67 constitutes a bypass clutch control means and an input clutch control means, and can change the bypass clutch 50 and the input clutch 15 into the engaged state and the disengaged state by outputting an engagement signal and a disengagement signal to the electromagnetic valve VA1 and the electromagnetic valve VA2. In this case, an electromagnetic pressure control valve is used as the electromagnetic valve VA1 and the electromagnetic valve VA2, and it is possible to form a half clutch state (a sliding control state) in addition to the changing operation of the bypass clutch 50 and the input clutch 15 between the engaged state and the disengaged state.

A description will be given below of an automatic shift control using the hydraulic control system shown in FIG. 2. First, when a driving range is selected in accordance with an operation of a select lever (not shown) by a driver from a stopping state of the vehicle, the select actuator 63 and the shift actuator 64 are driven in accordance with an output of the control signal from the ECU 67, and the first changing mechanism 41 is changed, whereby the transmission speed range is set to the first speed. Next, when a brake pedal is released and an accelerator pedal is stepped on, the input clutch actuator 62 driven on the basis of the output of the engagement signal from the ECU 67, and the input clutch 15 is changed into the engaged state, whereby the vehicle starts driving. In this case, the operation of the selector lever is input to the ECU 67 via the inhibitor switch 77.

A shifting property map obtained by employing a vehicle speed, a throttle opening degree and the like as a parameter is stored in the ECU 67, the transmission speed range is set in correspondence to the vehicle speed and the throttle opening degree in the course of driving. For example, when the vehicle speed of the vehicle which is started on the basis of the first speed is increased, the ECU 67 determines a shift up to the second speed in accordance with the shifting property map. Sequentially, the shift actuator 64 is driven on the basis of the control signal output from the ECU 67, and the first changing mechanism 41 is changed, whereby the transmission speed range is set to the second speed. As mentioned above, the ECU 67 determines the transmission speed range in correspondence to the vehicle condition in accordance with the shifting property map, and appropriately executes a shift up and a shift down for the transmission speed range. In this case, the vehicle speed is computed by the ECU 67 corresponding to the vehicle speed detecting means on the basis of the output signals from the wheel rotational speed sensor 72 and the output shaft rotational speed sensor 76, and the throttle opening degree and the engine speed are input to the ECU 67 from the throttle opening degree sensor 73 and the engine speed sensor 74.

As a shifting method at a time of executing the above-mentioned shift change, there are set two shifting methods comprising a clutch engagement shifting method of executing a shifting operation while changing the bypass clutch 50 into the engaged state in a state of maintaining the input clutch 15 in the engaged state, and a clutch disengagement shifting method of executing the shifting operation while changing the input clutch 15 into the disengaged state. In this case, it is determined by the ECU 67, in correspondence to the vehicle condition as mentioned below, which of the two shifting methods is used.

First, a description will be given of a shifting process of the clutch engagement shifting. For example, in the case of shifting up from the first speed to the second speed, the bypass clutch 50 starts being engaged step by step while maintaining the engaged state of the input clutch 15. Accordingly, the power transmitted to the output shaft 14 via the bypass clutch 50 is increased step by step while the power transmitted to the output shaft 14 via the first speed transmission gear train is reduced step by step. Next, the engagement between the synchro sleeve 41b and the spline 31a is disconnected in a state in which the power transmitted via the first speed transmission gear train is reduced, and the first changing mechanism 41 is changed into a neutral state. Accordingly, the fastening force of the bypass clutch 50 can be further increased.

At this time, since the bypass clutch 50 can transmit the power on the basis of the driving torque corresponding to the intermediate gear ratio between the third speed and the fourth speed, the engine speed with increasing in driving at the first speed is decreased for the speed corresponding to the intermediate gear ratio. At a time when the engine speed reaches that corresponding to the second speed, the first changing mechanism 41 is changed into the second speed side, and the bypass clutch 50 is disengaged step by step.

Further, in the case of shifting down to the first speed from the second speed, the bypass clutch 50 is engaged in the same manner. Accordingly, it is possible to transmit the driving torque via the bypass clutch 50 in the neutral state of the changing mechanisms 41 to 43 in which the decline of the driving torque may be generated in the course of shifting, and it is possible to obtain a good shift feeling. In this case, the clutch engagement shifting is effective particularly in the low speed range in which a difference in driving torque tends to be generated after shifting, however, the decline of the driving torque can be reduced by engaging the bypass clutch 50 even at a time of shifting to the other transmission speed ranges than the first speed and the second speed.

Subsequently, a description will be given of a shifting process of the clutch disengagement shifting. For example, in the case of shifting up to the second speed from the first speed, the input clutch 15 is first changed into the disengaged state, and the first changing mechanism 41 is changed into the second speed side via the neutral state. Subsequently, the input clutch 15 and the electronically controlled throttle are controlled, and the input clutch 15 is changed into the engaged state after synchronizing the engine speed with the input shaft rotational speed corresponding to the second speed.

Further, in the case of shifting down to the first speed from the second speed, the input clutch 15 is changed to the disengaged state in the same manner, the first changing mechanism 41 is changed into the first speed side via the neutral state, thereafter the engine speed is synchronized with the input shaft rotational speed corresponding to the first speed, and the input clutch 15 is changed into the engaged state. In this case, the shifting operation in accordance with the same process is executed at a time of shifting to the other transmission speed ranges than the first speed and the second speed.

It is determined in accordance with the shifting program stored in the ECU 67 corresponding to the shifting operation judging means which of the clutch engagement shifting and the clutch disengagement shifting is used for executing the shifting operation. The shifting program determines which of the clutch engagement shifting and the clutch disengagement shifting should be used in correspondence to the vehicle condition, the clutch engagement shifting is employed in the case that the accelerator pedal is stepped on by the driver, and the clutch disengagement shifting is employed in the case that the accelerator pedal is not stepped on. In this case, the vehicle condition is not limited to a matter whether or not the accelerator pedal is stepped on, may be determined on the basis of various parameters such as the vehicle speed, the engine speed, the throttle opening degree and the like, or may be judged in a compositive manner by using the parameters.

Figure 3:
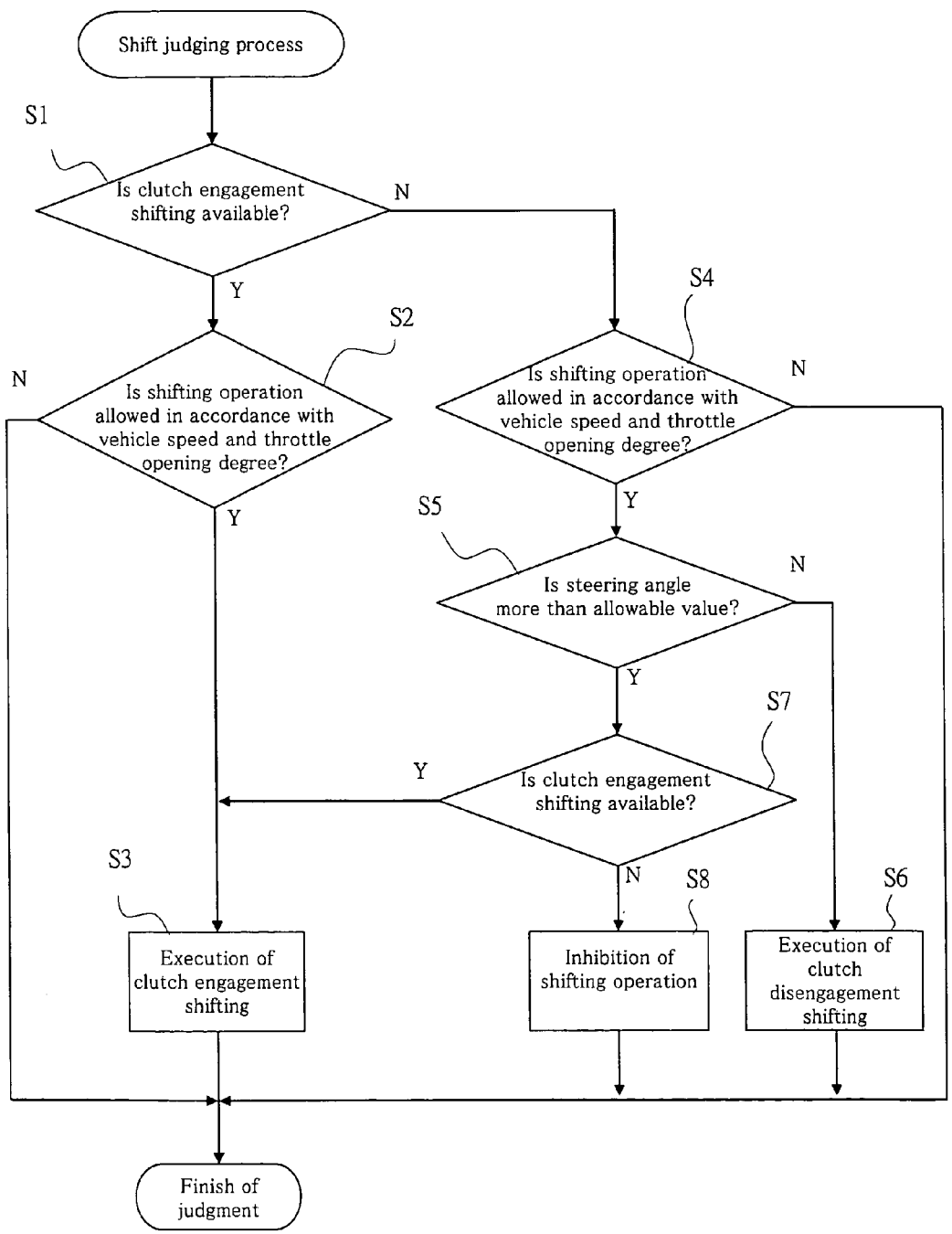
FIG. 3 is a flow chart showing an example of a shift judging procedure in an automatic shift control.

A description will be given below of a procedure of judging the shifting by the shift control apparatus. FIG. 3 is a flow chart showing an example of the shift judging procedure in the automatic shift control. First, as shown in a step S1, it is judged in correspondence to the vehicle condition whether or not the shifting operation using the bypass clutch 50, that is, the clutch engagement shifting can be executed. In the case that the clutch engagement shifting can be executed, the step goes to a step S2, and it is judged on the basis of the current vehicle speed and throttle opening degree in accordance with the shifting property map whether or not the shifting operation is allowed. In the case that the shifting operation is not allowed, the step drops out of a routine as it is, on the other hand, in the case that the shifting operation is allowed, the step goes to a step S3, the clutch engagement shifting operation using the bypass clutch 50 is executed and the transmission speed range is changed.

Further, in the case that it is judged in the step S1 that the clutch engagement shifting can not be executed, the step goes to a step S4, and it is judged in the same manner in accordance with the shifting property map whether or not the shifting operation is allowed. In the case that the shifting operation is not allowed, the step drops out of the routine as it is, on the other hand, in the case that the shifting operation is allowed, the step goes to a step S5, and the allowable value previously set on the basis of tests or the like and stored in the ECU 67 and the current steering angle are comparatively judged.

In this case, the steering angle judged in the step S5 is a steering angle of the wheel, and is detected by the ECU 67 corresponding to the steering angle detecting means on the basis of the output signals from the steering angle sensor 70, the acceleration sensor 71, the wheel rotational speed sensor 72 and the like. For example, since the rotational angle of the steering shaft is detected from the steering angle sensor 70, it is possible to directly detect the steering angle of the wheel. Further, since the acceleration in a width direction of the vehicle is detected from the acceleration sensor 71, it is possible to indirectly detect the steering angle of the wheel on the basis of the turning state of the vehicle, and since the difference in rotational speed between the right and left wheels and the front and rear wheels, that is, the wheel speed ratio can be detected from the wheel rotational speed sensor 72, it is possible to indirectly detect the steering angle of the wheel on the basis of the turning state of the vehicle.

In the case that the steering angle is less than the allowable value in the step S5, that is, in the case that it is judged that the vehicle is in a straight driving state or a gentle turning state, the step goes to a step S6, the clutch disengagement shifting is executed, and the transmission speed range is changed. On the other hand, in the case that the steering angle is more than the allowable value, that is, in the case that it is judged that the vehicle is in the turning state, the step goes to a step S7, and it is again judged whether or not the clutch engagement shifting can be executed. In the case that the clutch engagement shifting can be executed, the step goes to the step S3, the clutch engagement shifting is executed, and the transmission speed range is changed. On the other hand, in the case that the clutch engagement shifting can not be executed, the step goes to a step S8, the output of the releasing signal to the input clutch 15 from the ECU 67 corresponding to the input clutch control signal is inhibited, and the shifting operation in a state in which the input clutch 15 is disengaged, that is, the clutch disengagement shifting is inhibited.

As mentioned above, since the structure is made such that the shifting operation in the state in which the input clutch 15 is disconnected is inhibited, in the case that the vehicle is in a predetermined turning state, by judging a magnitude of the steering angle, it is possible to avoid the decline of the driving torque in the course of turning, and it is possible to improve a driving stability of the vehicle. For example, even in the condition of traveling with a small turning radius such as traveling around a point of intersection, it is possible to avoid a destabilization in a vehicle motion such as an under steer and an over steer.

Figure 4:
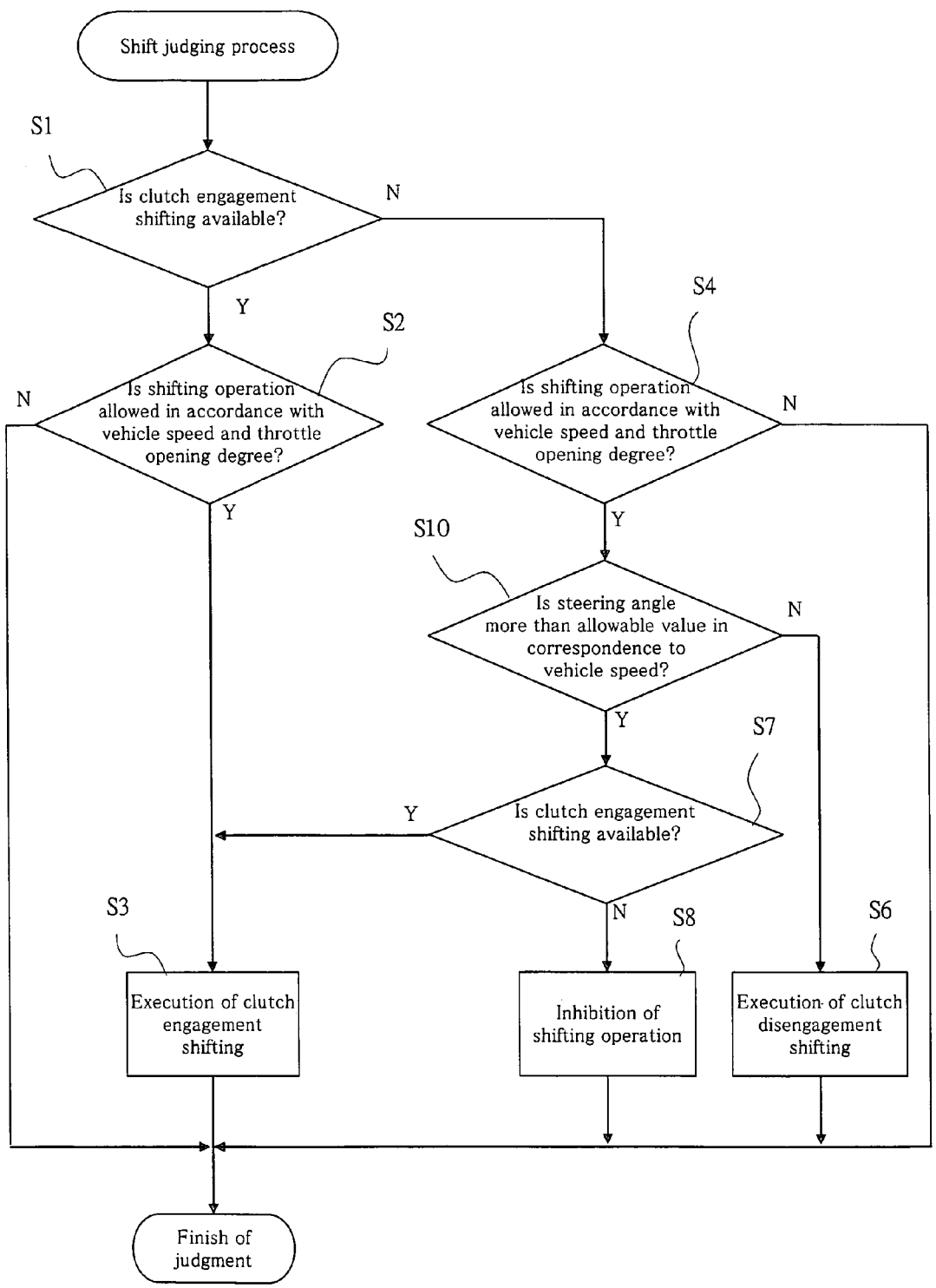
FIG. 4 is a flow chart showing another example of the shift judging procedure in the automatic shift control.

FIG. 4 is a flow chart showing another example of the shift judging procedure in the automatic shift control. This flow chart corresponds to a flow chart in which the allowable value to be compared in the step S5 in FIG. 3 is changed in correspondence to the vehicle speed. In this case, in FIG. 4, the same reference numerals are attached to the common steps with those in FIG. 3, and a description thereof will be omitted.

As shown in FIG. 4, in the case that it is judged in the step S1 that the clutch engagement shifting can not be executed, and the shifting operation is allowed in the step S4, the current steering angle and the allowable value changing in correspondence to the vehicle speed are comparatively judged in the succeeding step S10. In this case, an allowable value table obtained by setting the vehicle speed as the parameter is stored in the ECU 67, and the allowable value to be compared is selected from the allowable value table in correspondence to the vehicle speed. In this case, the allowable value within the allowable value table is set to be larger in accordance with an increase of the vehicle speed.

In the case that the steering angle is less than the selected allowable value in the step S10, the step goes to the step S6, the clutch disengagement shifting is executed and the transmission speed range is changed. On the other hand, in the case that the steering angle is more than the allowable value, the step goes to the step S7 and it is again judged whether or not the clutch engagement shifting can be executed. In the case that the clutch engagement shifting can be executed, the step goes to the step S3, the clutch engagement shifting is executed and the transmission speed range is changed. On the other hand, in the case that the clutch engagement shifting can not be executed, the step goes to the step S8, the disengaging signal is inhibited from being output from the ECU 67 to the input clutch 15, and the shifting operation in the state in which the input clutch 15 is disengaged, that is, the clutch disengagement shifting is inhibited.

As mentioned above, since the structure is made such that the allowable value is changed in correspondence to the vehicle speed, it is possible to set the allowable value, namely the steering angle, for inhibiting the clutch disengagement shifting in correspondence to the vehicle speed range. In particular, since it is possible to avoid the inhibition of the shifting operation in the automatic shift control in the high vehicle speed range, by setting such that the allowable value is increased in accordance with the increase of the vehicle speed, it is possible to securely execute the shift up for executing a favorable mileage driving in the high vehicle speed range, the shift down for re-acceleration and the like in accordance with the shifting property map.

Figure 5:
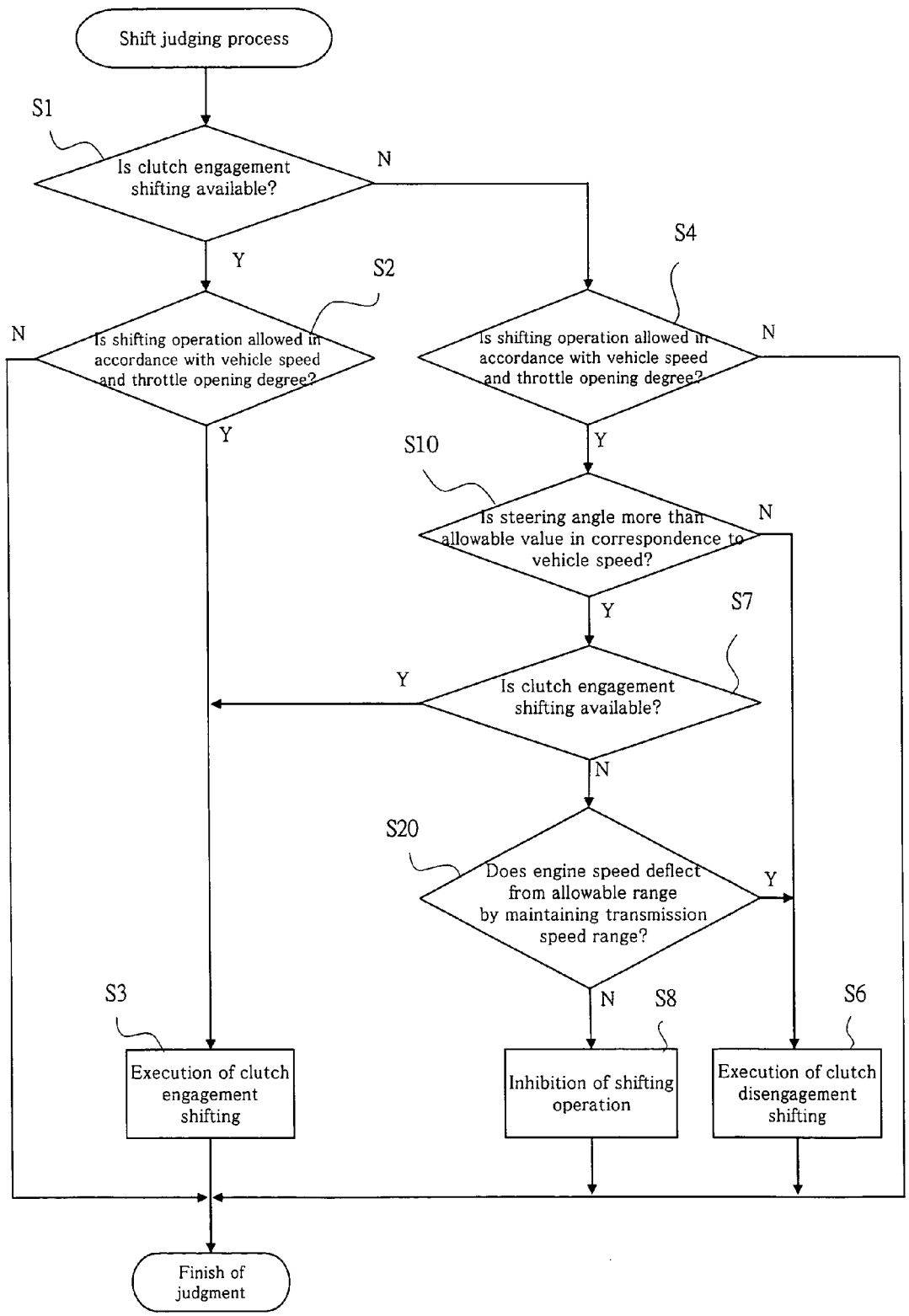
FIG. 5 is a flow chart showing the other example of the shift judging procedure in the automatic shift control.

FIG. 5 is a flow chart showing the other example of the shift judging procedure in the automatic shift control. This flow chart corresponds to a flow chart in which the engine speed is comparatively judged between the step 7 and the step 8 in FIG. 3. In this case, in FIG. 5, the same reference numerals are attached to the common steps with those in FIGS. 3 and 4, and a description thereof will be omitted.

As shown in FIG. 5, in the case that it is judged in the step S1 that the clutch engagement shifting can not be executed, and the shifting operation is allowed in the step S4, it is judged in the succeeding step S10 that the steering angle is less than the allowable value, and it is judged again in the step S7 that the clutch engagement shifting can not be executed, the engine speed in the case of maintaining the transmission speed range is judged in the succeeding step S20.

The engine speed to be judged in the step S20 is an engine speed which is estimated in the case that the transmission speed range is maintained, that is, the shifting operation is not executed. The ECU 67 corresponding to the rotational speed estimating means comprehensively perform an arithmetical operation in accordance with the current engine speed input from the engine speed sensor 74, the current vehicle speed computed on the basis of the signals input from the wheel rotational speed sensor 72 and the output shaft rotational speed sensor 76, the acceleration in the forward moving direction input from the acceleration sensor 71, the current transmission speed range and gear ratio stored in the ECU 67, and the like, and estimates the engine speed in the case of maintaining the transmission speed range.

Further, the allowable range of the engine speed previously set in accordance with the test or the like is stored in the ECU 67, and the ECU 67 comparatively judges the estimated engine speed and the stored allowable range. In this case, the stored allowable range is defined as the engine speed in which no trouble is generated in the driving. For example, in the case that there is a risk that the engine speed is lowered so as to generate an engine stall by maintaining the transmission speed range, or in the case that there is a risk that the engine speed is increased so as to generate an over rev of the engine 11, the engine speed deflects from the allowable range.

In the step S20, in the case that the estimated engine speed deflects from the allowable range and it is recognized that there is a risk that the engine stall or the over rev is generated, the step goes to the step S3, the clutch disengagement shifting is executed, and the transmission speed range is changed. On the other hand, it is recognized that there is no risk because the estimated engine speed is within the allowable range, the step goes to the step S8, the disengagement signal is inhibited from being output from the ECU 67 to the input clutch 15, and the shifting operation in the state in which the input clutch 15 is disengaged, that is, the clutch disengagement shifting is inhibited.

As mentioned above, since the structure is made such as to estimate the engine speed in the case of maintaining the transmission speed range without executing the shifting operation and comparatively judge the estimated engine speed and the allowable range of the engine speed stored in the ECU 67, it is possible to allow the shifting operation in the case that any trouble is generated in the traveling due to the inhibition of the shifting. Accordingly, it is possible to avoid the generation of the engine stall and the over revolution due to the inhibition of the shifting operation. For example, even in the case that the vehicle speed is lowered due to the point of intersection or the like, it is possible to safely apply the shift inhibiting control in correspondence to the steering angle.

As described above, the shifting judgment executed in accordance with the flow charts in FIGS. 3 to 5 is applied to the automatic transmission 10 shown in FIG. 1, that is, the automatic transmission 10 provided with the input clutch 15 and the bypass clutch 50, however, it is possible to apply the shifting judgment achieved by the shift control apparatus in accordance with the present invention to an automatic transmission having no bypass clutch 50.

A description will be given below of a procedure of a shifting judgment achieved by the shift control apparatus of the automatic transmission having no bypass clutch 50. As a hydraulic control system provided in the shift control apparatus of the automatic transmission, there is employed a hydraulic control system obtained by removing the electromagnetic valve VA1 and the bypass clutch actuator 61 from the hydraulic control system shown in FIG. 2. Further, since the automatic transmission is provided with the bypass clutch 50, only the clutch disengagement shifting mentioned above is executed as the shifting method.

Figure 6:
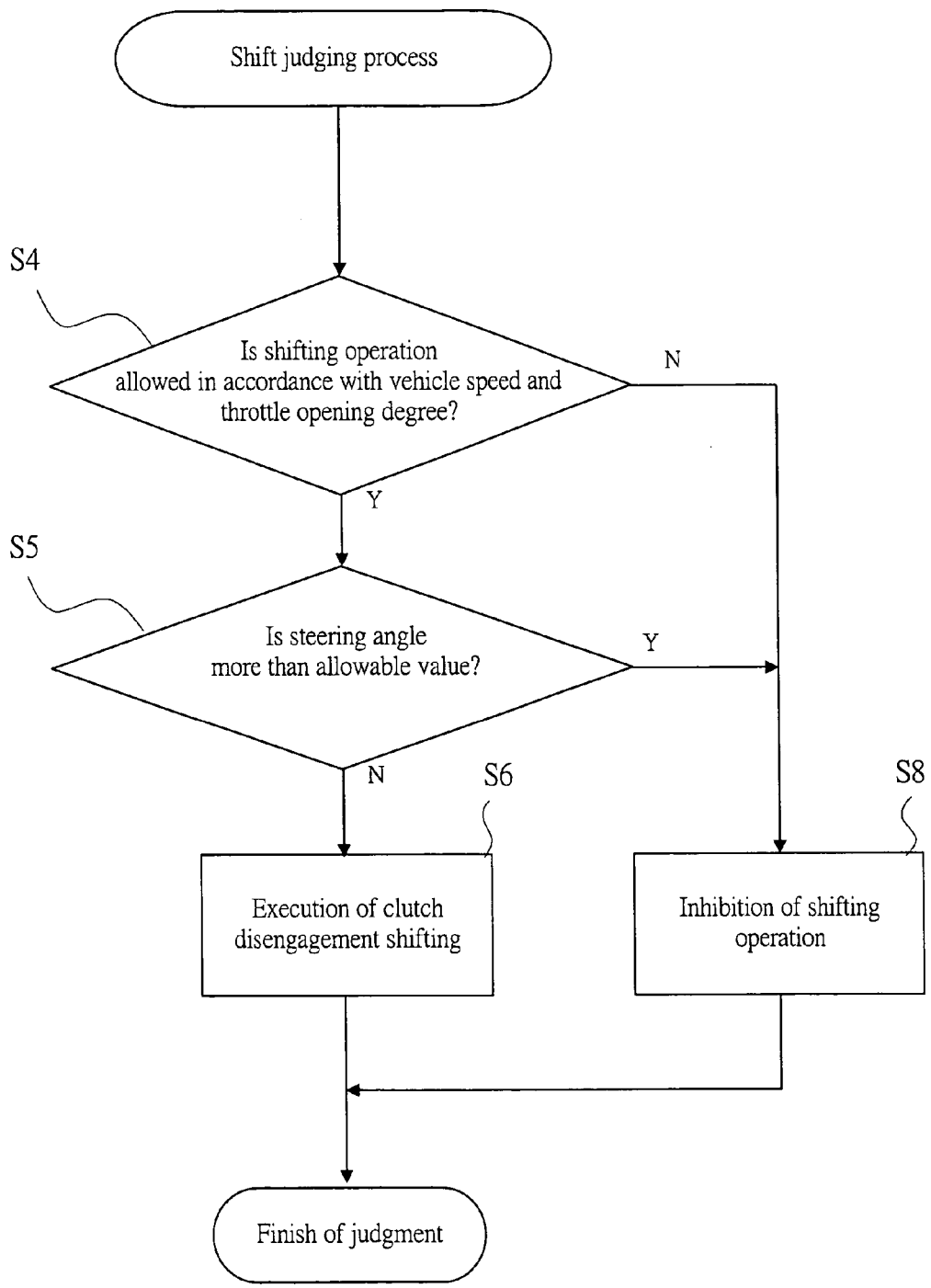
FIG. 6 is a flow chart showing another example of the shift judging procedure in the automatic shift control.

FIG. 6 is a flow chart showing an example of the shift judging procedure in the automatic shift control. In FIG. 6, the same reference numerals are attached to the common steps with those in FIG. 3, and a description thereof will be omitted. As shown in FIG. 6, in the case that the shifting operation is not allowed in the step S4, the step goes to the step S8 and the step drops out of the routine without executing the shifting operation. On the other hand, in the case that the shifting operation is allowed, the step goes to the step S5, and the allowable value and the steering angle are comparatively judged.

In the case that the steering angle is less than the allowable value in the step S5, the step goes to the step S6, the clutch disengagement shifting is executed, and the transmission speed range is changed. On the other hand, in the case that the steering angle is more than the allowable value, the step goes to the step S8, the disengagement signal is inhibited from being output from the ECU 67 to the input clutch 15, and the shifting operation in the state in which the input clutch 15 is disengaged, that is, the clutch disengagement shifting is inhibited.

Figure 7:
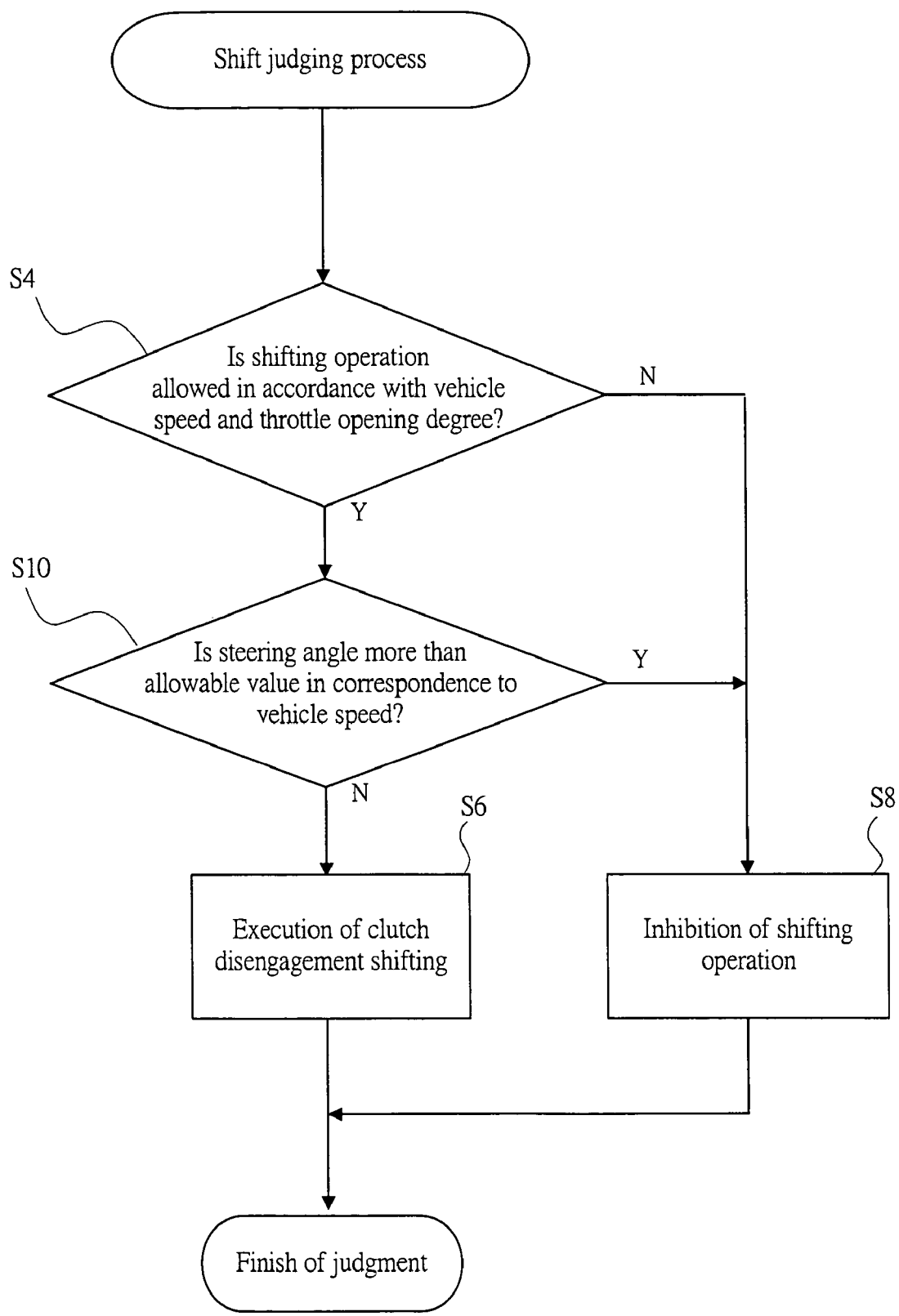
FIG. 7 is a flow chart showing another example of the shift judging procedure in the automatic shift control.

FIG. 7 is a flow chart showing the other example of the shift judging procedure in the automatic shift control. In FIG. 7, the same reference numerals are attached to the common steps with those in FIG. 4, and a description thereof will be omitted. As shown in FIG. 7, in the case that the shifting operation is not allowed in the step S4, the step goes to the step S8 and the step drops out of the routine without executing the shifting operation. On the other hand, in the case that the shifting operation is allowed, the step goes to the step S10, and the allowable value changing in correspondence to the vehicle speed and the current steering angle are comparatively judged.

In the case that the steering angle is less than the allowable value in correspondence to the vehicle speed in the step S5, the step goes to the step S6, the clutch disengagement shifting is executed, and the transmission speed range is changed. On the other hand, in the case that the steering angle is more than the allowable value in correspondence to the vehicle speed, the step goes to the step S8, the disengagement signal is inhibited from being output from the ECU 67 to the input clutch 15, and the shifting operation in the state in which the input clutch 15 is disengaged, that is, the clutch disengagement shifting is inhibited.

Figure 8:
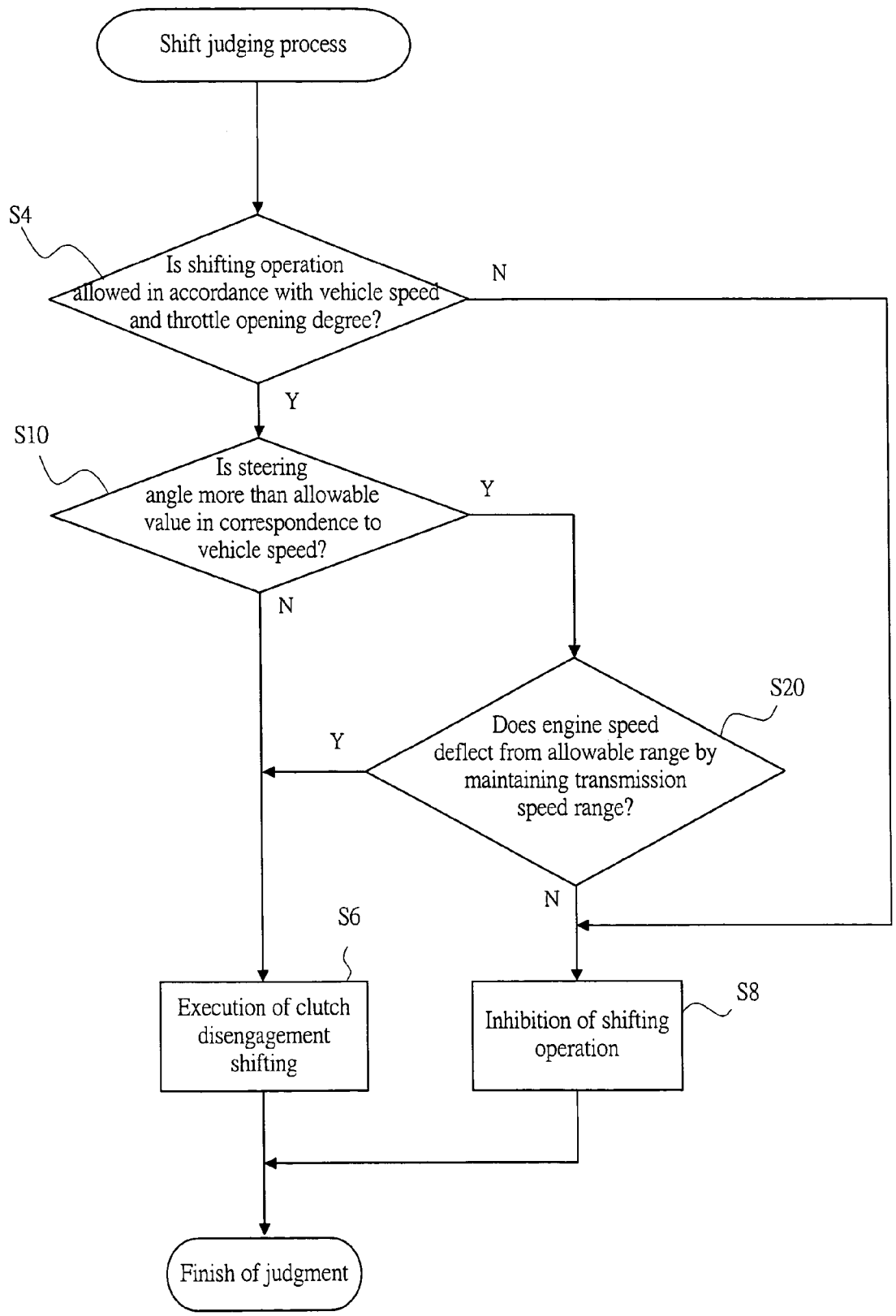
FIG. 8 is a flow chart showing another example of the shift judging procedure in the automatic shift control.

FIG. 8 is a flow chart showing the other example of the shift judging procedure in the automatic shift control. In FIG. 8, the same reference numerals are attached to the common steps with those in FIG. 5, and a description thereof will be omitted. As shown in FIG. 8, in the case that the shifting operation is not allowed in the step S4, the step goes to the step S8 and the step drops out of the routine without executing the shifting operation. On the other hand, in the case that the shifting operation is allowed, the step goes to the step S10, and the allowable value changing in correspondence to the vehicle speed and the current steering angle are comparatively judged.

In the case that the steering angle is less than the allowable value in correspondence to the vehicle speed in the step S10, the step goes to the step S6, the clutch disengagement shifting is executed, and the transmission speed range is changed. On the other hand, in the case that the steering angle is more than the allowable value in correspondence to the vehicle speed, the engine speed in the case of maintaining the transmission speed range is judged in the succeeding step S20.

In the step S20, in the case that the engine speed estimated by the ECU 67 and the allowable range stored in the ECU 67 are comparatively judged, and it is recognized that there is a risk that the engine stall or the over revolution is generated, the step goes to the step S3, the clutch disengagement shifting is executed, and the transmission speed range is changed. On the other hand, it is recognized that there is no risk because the estimated engine speed is within the allowable range, the step goes to the step S8, the disengagement signal is inhibited from being output from the ECU 67 to the input clutch 15, and the shifting operation in the state in which the input clutch 15 is disengaged, that is, the clutch disengagement shifting is inhibited.

As mentioned above, even in the automatic transmission in which the shifting method is constituted only by the clutch disengagement shifting, since the structure is made such that the shifting operation in the state in which the input clutch 15 is disconnected is inhibited, in the case that the vehicle is in a predetermined turning state, by judging a magnitude of the steering angle, it is possible to avoid the decline of the driving torque in the course of turning, and it is possible to improve a driving stability of the vehicle. For example, even in the condition of traveling with a small turning radius such as traveling around a point of intersection, it is possible to avoid a destabilization in a vehicle motion such as an under steer and an over steer.

Further, in the case that the structure is made such that the allowable value is changed in correspondence to the vehicle speed, it is possible to set the steering angle for inhibiting the clutch disengagement shifting in correspondence to the vehicle speed range. In particular, since the inhibition of the shifting operation is not generated in the automatic shift control in the high vehicle speed range, by setting such that the allowable value is increased in accordance with the increase of the vehicle speed, it is possible to securely execute the shift up for executing a favorable mileage traveling in the high vehicle speed range, the shift down for re-acceleration and the like in accordance with the shifting property map.

Further, since the structure is made such as to estimate the engine speed in the case of maintaining the transmission speed range and comparatively judge whether or not the engine speed is within the allowable range, it is possible to allow the shifting operation in the case that any trouble is generated in the traveling due to the inhibition of the shifting. Accordingly, it is possible to avoid the generation of the engine stall and the over rev due to the inhibition of the shifting operation.

The present invention is not limited to the embodiments mentioned above, and can be variously modified within the scope of the present invention. For example, the input clutch 15 and the bypass clutch 50 have a fluid pressure as a driving source, however, can employ a clutch such as an electromagnetic clutch which is driven in accordance with an electric current control from the ECU 67.

Further, the illustrated automatic transmission 10 is structured for the front wheel drive mounted horizontally, however, may be constituted by an automatic transmission for a rear wheel drive or a four wheel drive, or may be constituted by an automatic transmission mounted vertically. Further, the illustrated automatic transmission 10 is provided with one bypass clutch 50, however, may be structured such that a plurality of bypass clutches 50 are provided.

In this case, in the flow charts illustrated in FIGS. 5 and 8, the allowable value changing in correspondence to the vehicle speed and the current steering angle are comparatively judged in the step S10, however, the structure may be made such that the allowable value corresponding to a fixed value and the current steering angle may be comparatively judged.

The entire disclosure of Japanese Patent Application No. 2003-87002 filed on Mar. 27, 2003 including specification, claims, drawings and summary is incorporated herein by reference in its entirety.

What is claimed is:

1. A shift control apparatus of an automatic vehicle transmission comprising:
    an input shaft provided with a plurality of drive gears;
    an output shaft arranged in parallel to said input shaft and provided with a plurality of driven gears engaging with said drive gears so as to form transmission gear trains;
    an input clutch arranged between an engine and said input shaft and changed into an engaged state for transmitting a power to said input shaft and a disengaged state for interrupting the power;
    a changing mechanism changing any one of said transmission gear trains into a power transmission state;
    a steering angle detecting means for detecting a steering angle of a wheel; and
    an input clutch control means for outputting a disengagement signal to said input clutch in the case that said steering angle is less than an allowable value and inhibiting an output of the disengagement signal in the case that said steering angle is more than the allowable value, at a time of executing a gear-shift operation,
    wherein, in the case that said steering angle is more than the allowable value, the gear-shift operation in a state that said input clutch is disengaged is inhibited.

2. The shift control apparatus of an automatic vehicle transmission according to claim 1, further comprising:
    a bypass clutch arranged between said input shaft and said output shaft and changed into an engaged state for transmitting a power from said input shaft to said output shaft and a disengaged state for interrupting the power at a time of executing the gear-shift operation,
    wherein said input clutch control means inhibits the gear-shift operation in a state that said input clutch is disengaged, by inhibiting the output of the disengagement signal applied to said input clutch, in the case that there is judged the gear-shift operation in which said steering angle is more than the allowable value and said bypass clutch is not engaged.

3. The shift control apparatus of an automatic vehicle transmission according to claim 1, further comprising:
    a vehicle speed detecting means for detecting a vehicle speed, wherein said allowable value is set in correspondence to the vehicle speed.

4. The shift control apparatus of an automatic vehicle transmission according to claim 1, further comprising:
- a rotational speed estimating means for estimating an engine speed at a time of maintaining a transmission speed range, wherein said input clutch control means inhibits the gear-shift operation in a state that said input clutch is disengaged, by inhibiting the output of the disengagement signal applied to said input clutch, in the case that said steering angle is more than the allowable value and said engine speed is within an allowable range.

* * * * *